(12) United States Patent
Hirobe et al.

(10) Patent No.: US 6,590,629 B1
(45) Date of Patent: Jul. 8, 2003

(54) LIQUID CRYSTAL DISPLAY HAVING A PLURALITY OF MOUNTING SUBSTRATES WITH COMMON CONNECTION LINES CONNECTING THE MOUNTING SUBSTRATES

(75) Inventors: Toshihiko Hirobe, Sakai (JP); Tetsuya Tarui, Osaka (JP); Yoshitaka Hibino, Matsusaka (JP); Naofumi Kondo, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/497,671

(22) Filed: Feb. 4, 2000

(30) Foreign Application Priority Data

Feb. 5, 1999 (JP) .......................... 11-028685

(51) Int. Cl.[7] .............................. G02F 1/1345
(52) U.S. Cl. .................. 349/149; 349/150; 349/151; 349/152
(58) Field of Search ................. 349/149, 152; 345/206

(56) References Cited

U.S. PATENT DOCUMENTS 5,130,833 A * 7/1992 Mase
5,945,984 A * 8/1999 Kuwashiro

FOREIGN PATENT DOCUMENTS

| JP | 4-217229 A | 8/1992 |
|----|---|---|
| JP | 5-303109 A | 11/1993 |
| JP | 6-202132 A | 7/1994 |
| JP | 6-222377 A | 8/1994 |
| JP | 6-223896 A | 8/1994 |
| JP | 6-231814 A | 8/1994 |
| JP | 8-6058 A | 1/1996 |
| JP | 8-304845 A | 11/1996 |
| JP | 409005381 A * | 1/1997 |
| JP | 9-244045 A | 9/1997 |
| KR | 0144283 B1 | 4/1998 |

* cited by examiner

Primary Examiner—Julie Ngo
(74) Attorney, Agent, or Firm—Nixon & Vanderhye P.C.

(57) ABSTRACT

A liquid crystal display including an active matrix substrate furnished with a matrix of TFTs, in which a plurality of TAB substrates each having a driver IC are connected to the active matrix substrate through an ACF, and the driver ICs are connected to source bus lines through the ACF. Also, adjacent driver ICs disposed on the mounting substrates are connected to each other through common connection lines formed on the active matrix substrate. Consequently, the size and weight of the mounting substrates used to provide the driver ICs and lines connected to the same can be reduced, thereby making it possible to provide a light and inexpensive liquid crystal display having a small frame edge portion.

16 Claims, 6 Drawing Sheets

LIQUID CRYSTAL DISPLAY HAVING A PLURALITY OF MOUNTING SUBSTRATES WITH COMMON CONNECTION LINES CONNECTING THE MOUNTING SUBSTRATES

FIELD OF THE INVENTION

The present invention relates to a liquid crystal display including an active matrix substrate furnished with a plurality of TFTs (Thin Film Transistors) in one-to-one correspondence with pixels, or a direct matrix substrate of an STN (Super Twisted Nematic) method, and driver ICs (Integrated Circuits) for driving individual pixels.

BACKGROUND OF THE INVENTION

A liquid crystal display employing a liquid crystal display element of a nematic type has been used widely as a liquid crystal display of a numeric segment type, such as a watch and a calculator. Recently, the use of such a liquid crystal display has been extended to display means for a word processor, a computer, and a navigation system.

Because the liquid crystal display is advantageous over a CRT in an extreme thinness (small depth), small power consumption, and the ease in displaying a full color image, the liquid crystal display has been in increasing demand in diversified fields as a monitor for devices of a power-saving and space-saving type. A liquid crystal display of an active matrix type has been particularly popular as the foregoing liquid crystal display, in which active elements such as TFTs are used as switching elements and a matrix of pixels are provided.

FIG. 4 is a view schematically showing an arrangement of a conventional liquid crystal display. As shown in the drawing, the liquid crystal display includes an active matrix substrate 51, a print substrate (hereinafter, referred to as PCB (Printed Circuit Board) 52, and a plurality of FPCs (Flexible Printed Circuits)) 58 which connect the active matrix substrate 51 and PCB 52.

A matrix of pixel electrodes 53 are formed on the active matrix substrate 51. Further, TFTs 54 are formed on the active matrix substrate 51 as switching elements for selectively driving the pixel electrodes 53. The TFTs 54 are connected to the pixel electrodes 53 in one-to-one correspondence. In case of color display, although it is not illustrated in the drawing, color filter layers of red, green and blue and a black matrix that blocks light incident on the circumference of each pixel are additionally provided on the active matrix substrate 51 or a counter substrate.

The gate electrode of each TFT 54 is connected to one of a plurality of gate bus lines 55 and the source electrode thereof is connected to one of a plurality of source bus lines 56. The gate bus lines 55 and source bus lines 56 are aligned along a matrix of the pixel electrodes 53 in such a manner so as to cross each other at right angles. The TFTs 54 are driven under control when a gate signal is inputted via the gate bus lines 55, whereupon a data signal (display signal) is inputted to the pixel electrodes 53 via the source bus lines 56 through the TFTs 54.

Although it is not illustrated in the drawing, a counter substrate is provided to oppose the active matrix substrate 51, and a liquid crystal layer is placed in a space between the active matrix substrate 51 and counter substrate and sandwiched by the same. Further, a counter electrode is formed on the counter substrate, and an image is displayed as the orientation of liquid crystal molecules varies in response to a voltage applied across the counter electrode and each pixel electrode 53 in accordance with image data.

On the other hand, a driver IC 57 is provided to each FPC 58. In each FPC 58, connection portions to the PCB 52 are interconnected to each other by means of ACF (Anisotropic Conductive Film) and connection portions to the active matrix substrate 51 are also interconnected to each other by means of the ACF. The driver ICs 57 and the source bus lines 56 are connected to each other by means of the ACFs 59 formed on the active matrix substrate 51 side. Also, the driver ICs 57 are connected to input lines 61 and common connection lines 62 (described below) by means of the ACFs 59 formed on the PCB 52 side.

One end of the PCB 52 is connected to a control signal input FPC 60 used to input an external control signal, such as a reference clock and a data signal. The output terminal of the control signal input FPC 60 and the input terminal of one particular driver IC 57 are connected to each other by means of the input lines 61 formed on the PCB 52. Further, every two adjacent driver ICs 57 are connected each other at their corresponding electrode terminals by means of the common connection line 62 formed on the PCB 52.

In other words, the control signal inputted from the control signal input FPC 60 enters into one particular driver IC 57 via the input lines 61 and reaches the other driver ICs 57 via the common connection lines 62. Then, the data signal is inputted to each source bus line 56 from each driver IC 57 through the ACF 59.

However, in case of the above arrangement that the active matrix substrate 51 and PCB 52 are connected to each other by means of the FPCs 58 and that the input lines 61 and common connection lines 62 are formed on the PCB 52, the following problem will occur. That is, when the active matrix substrate 51 and PCB 52 are connected to each other by means of the FPCs 58, the active matrix substrate 51 and PCB 52 have to be spaced apart. This undesirably increases an frame edge portion, that is, an outside area of the actual display area, of the liquid crystal display.

Also, because the input lines 61 and the common connection lines 62 connecting the adjacent driver ICs 57 have to be formed on the PCB 52, the size of the PCB 52 itself has to be increased. This also causes the frame edge portion of the liquid crystal display to be increased.

SUMMARY OF THE INVENTION

The present invention is devised to solve the above problems and has an object to provide a light and inexpensive liquid crystal display having a small frame edge portion by reducing the size and weight of a mounting substrate furnished with driver ICs for driving pixels individually as an outboard substrate for a substrate furnished with a matrix of pixels thereon.

In order to fulfill the above and other objects, a liquid crystal display of the present invention is characterized by being furnished with:
  a first substrate and a second substrate;
  a liquid crystal layer sandwiched between the first substrate and second substrate;
  data signal lines provided on one of the first substrate and second substrate;
  scanning signal lines provided on one of the first substrate and second substrate;
  a plurality of driver circuits for inputting a signal into the data signal lines and/or scanning signal lines; and a plurality of mounting substrates which are provided with the plurality of driver circuits and connected to the first substrate and/or second substrate; and common connection lines, provided on the first substrate and/or second substrate, for interconnecting the plurality of driver circuits.

According to the above arrangement, because each mounting substrate provided with the driver circuit is directly connected to the first substrate and/or second substrate, a total area of by the driver circuit section can be reduced compared with the case discussed in the prior art column where the active matrix substrate is connected to the PCB furnished with lines by means of the FPCs furnished with the driver ICs. Thus, not only can an area of the edge frame portion of the liquid crystal display be reduced, but also the weight thereof can be reduced. In addition, because fewer materials are used, the material costs can be saved. Moreover, because the number of steps in the manufacturing procedure is reduced, the manufacturing costs can be saved.

Also, because the common connection lines which interconnect the driver circuits are provided on the first substrate and/or second substrate, the size of the mounting substrates can be reduced compared with an arrangement by which the common connection lines are provided on the mounting substrates, for example. Thus, not only can the frame edge portion of the liquid crystal display be reduced further, but also the weight thereof can be reduced further.

For a fuller understanding of the nature and advantages of the invention, reference should be made to the ensuing detailed description taken in conjunction with the accompanying drawings.

DESCRIPTION OF THE EMBODIMENTS

Figure 1:
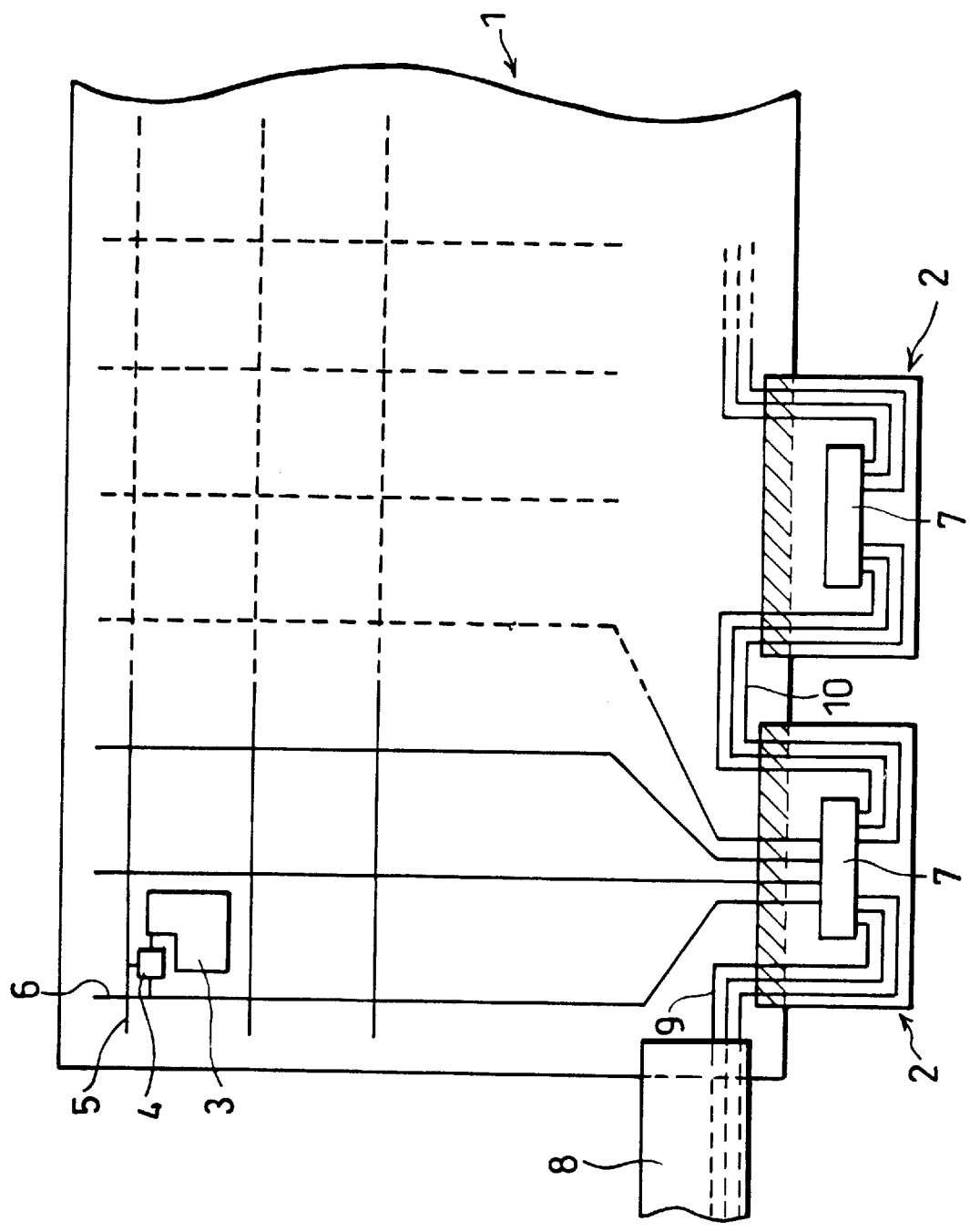
FIG. 1 is a partial plan view schematically showing an arrangement of a liquid crystal display in accordance with one embodiment of the present invention.
Figure 2:
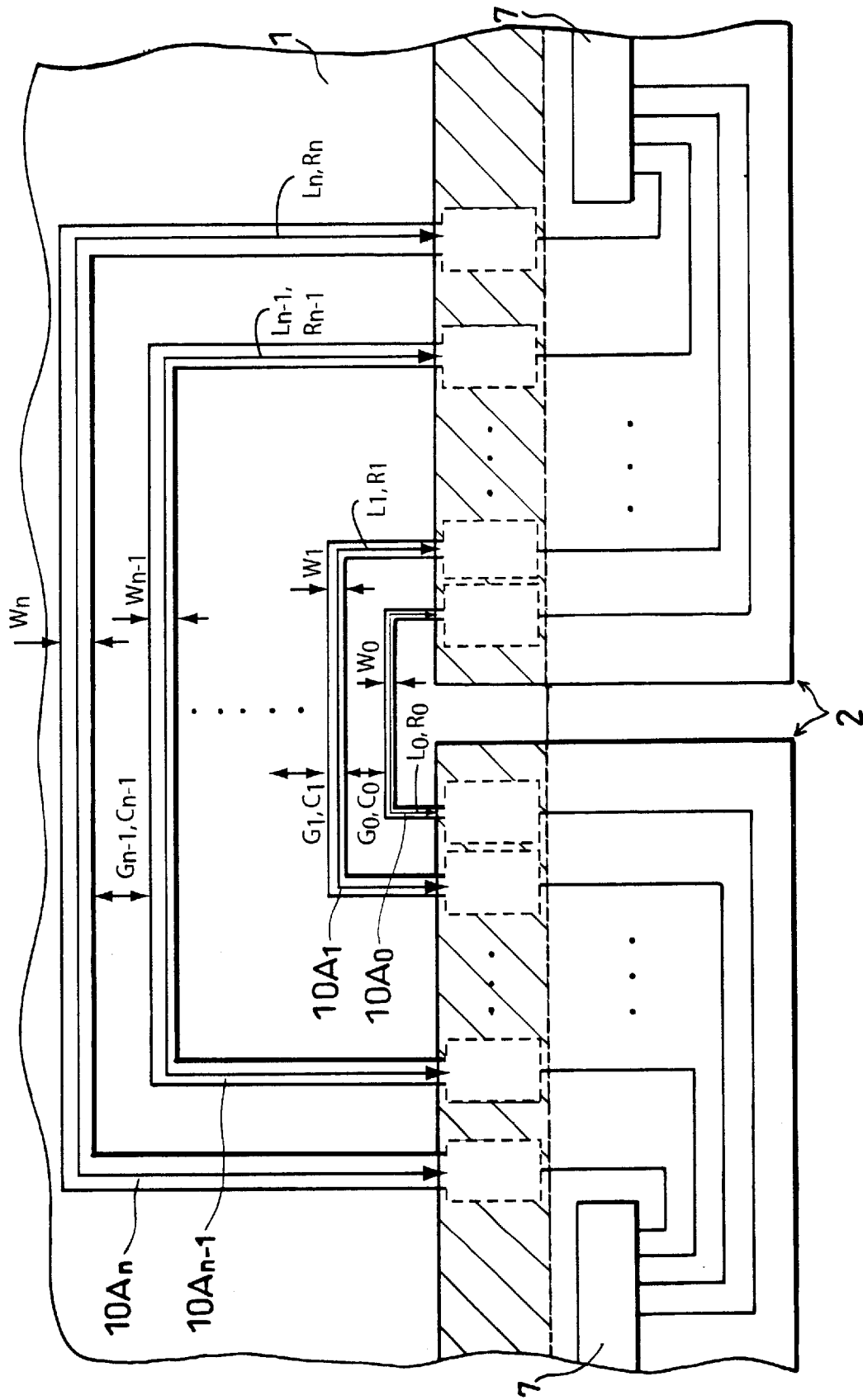
FIG. 2 is an enlarged plan view showing a portion of the liquid crystal display where common connection lines are provided.
Figure 3:
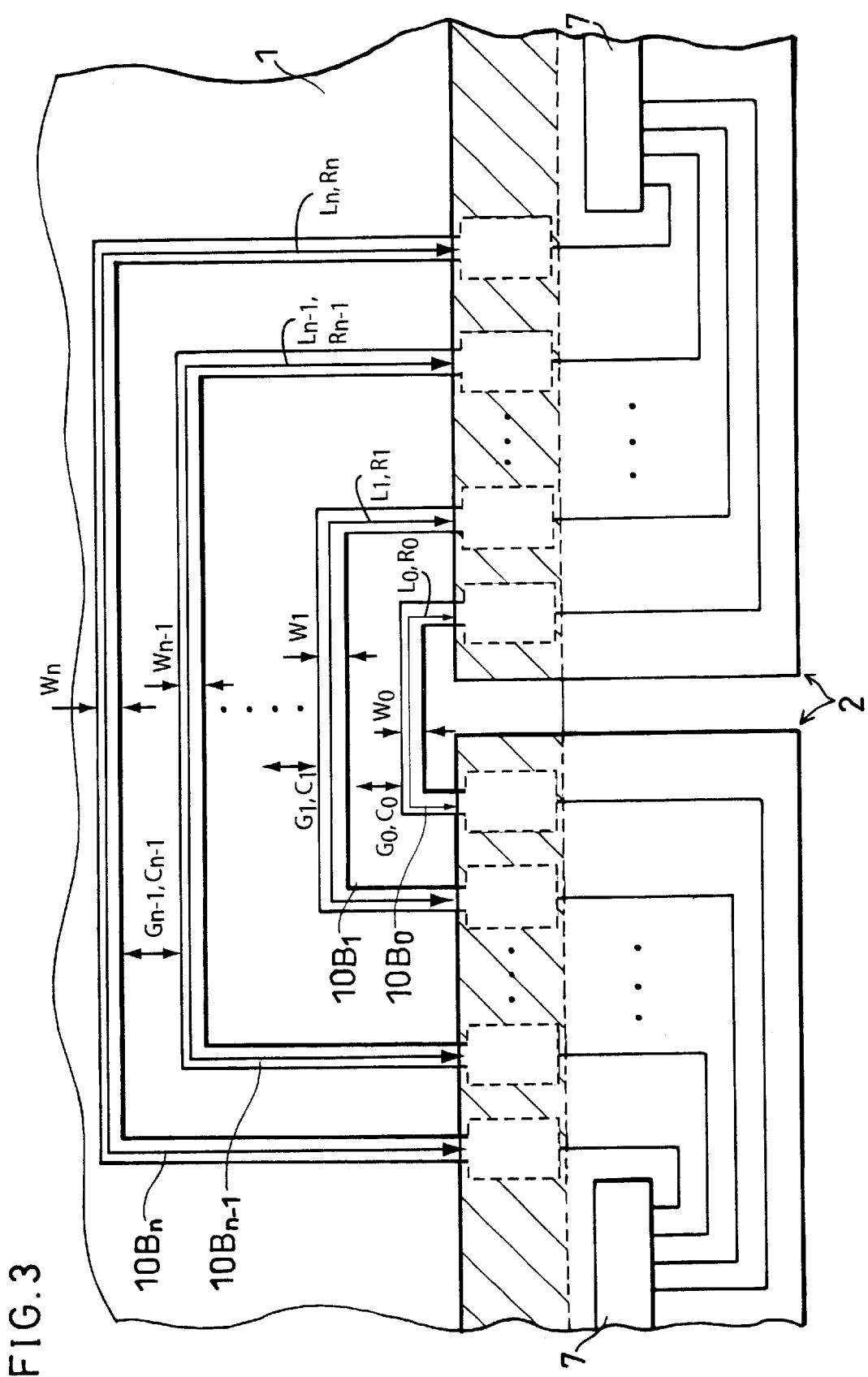
FIG. 3 is an enlarged plan view showing an arrangement of common connection lines of a comparative example.
Figure 4:
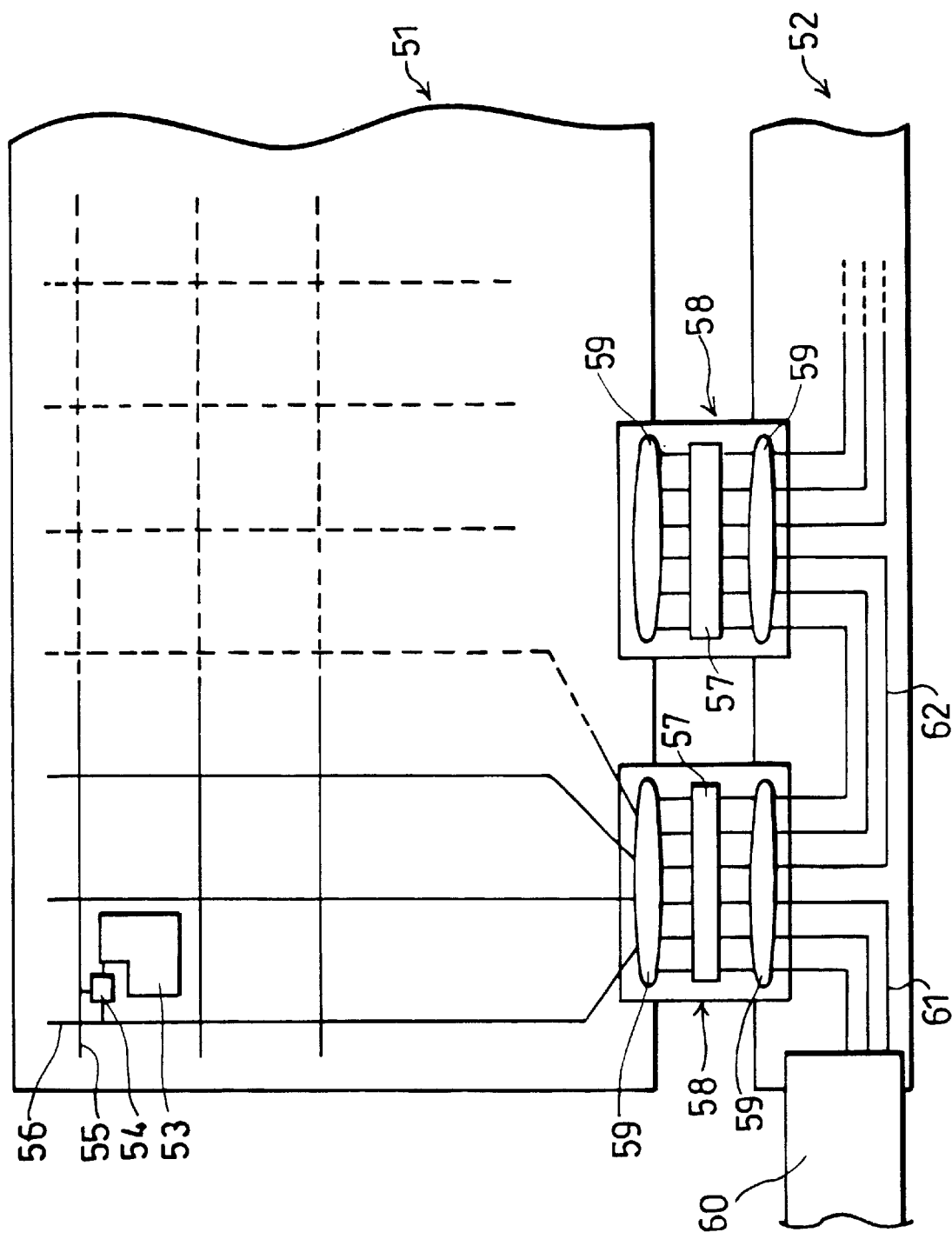
FIG. 4 is a partial plan view schematically showing an arrangement of a conventional liquid crystal display.

Referring to FIGS. 1 through 3, the following description will describe one embodiment of the present invention.

FIG. 1 is a view schematically showing an arrangement of a liquid crystal display of the present invention. As shown in the drawing, the liquid crystal display includes an active matrix substrate 1, and a plurality of TAB (Tape Automated Bonding) substrates (mounting substrates) 2.

A matrix of pixel electrodes 3 are formed on the active matrix substrate 1. Further, TFTs 4 are formed on the active matrix substrate 1 as switching elements for selectively driving the individual pixel electrodes 3. The drain electrode of each TFT 4 is connected to the corresponding pixel electrode 3.

The gate electrode of each TFT 4 is connected to one of gate bus lines 5, and the source electrode thereof is connected to one of source bus lines 6. The gate bus lines 5 and source bus lines 6 are aligned along the matrix of pixel electrodes 3 in such a manner so as to cross each other at right angles. The TFTs 4 are driven under control by an input of a gate signal via the gate bus lines 5, whereupon a data signal (display signal) is inputted into the pixel electrodes 3 via the source drive lines 6 through the TFTs 4.

The gate bus lines 5 and source bus lines 6 are made of multi-layer metal lines, and each includes at least one layer of aluminum.

Although it is not illustrated in the drawing, a counter substrate is provided to oppose the active matrix substrate 1, and a liquid crystal layer is provided in a space between the active matrix substrate 1 and counter substrate and sandwiched by the same. In addition, a counter electrode is formed on the counter substrate. Accordingly, an image is displayed as the orientation of liquid crystal molecules varies in response to a voltage applied across the counter electrode and each pixel electrode 3 in accordance with image data. Although it is not illustrated in the drawing either, in case of color display, color filter layers of red, green, and blue are provided on the active matrix substrate 1 or counter substrate.

On the other hand, the TAB substrates 2 are provided in predetermined intervals on the frame portion near one edge of the active matrix substrate 1. The TAB substrates 2 and active matrix substrate 1 are connected to each other by means of ACFs (Anisotropic Conductive Films). In FIG. 1, shaded areas indicate connected portions by means of the ACFs. As shown in the drawing, each TAB substrate 2 is provided in such a manner that only a part of an edge thereof is formed on the active matrix substrate 1. In other words, of the entire surface of the active matrix substrate 1, a total area of portions occupied for the connection to the TAB substrates 2 is quite small, thereby securing a larger effective display area in the active matrix substrate 1.

One driver IC (driver circuit) 7 is provided to each TAB substrate 2. The driver ICs 7 are connected to the source bus lines 6 by means of the ACFs. It should be appreciated that a plurality of source bus lines 6 are connected to one driver IC 7.

Because the TAB substrates 2 furnished with the driver ICs 7 are directly connected to the active matrix substrate 1 by means of the ACF, a total area of the driver circuits section can be reduced in comparison with the arrangement described in the prior art column that the active matrix substrate 51 and PCB 52 furnished with lines are connected to each other by means of FPCs 58 furnished with the driver ICs 57. Thus, not only can the frame edge portion of the liquid crystal display be reduced, but also the weight of the device can be reduced. In addition, because fewer materials are used, the material costs can be saved as well. Moreover, because several steps can be omitted in the manufacturing procedure, the manufacturing costs and time can be saved.

On the other hand, the active matrix substrate 1 is connected to a control signal input FPC (signal input circuit 8) for inputting an external control signal, such as a reference clock and a data signal, at the end portion near the edge to which the TAB substrates 2 are connected. The output terminal of the control signal input FPC 8 and the input terminal of the closest driver IC 7 are connected to each other via input lines 9. The input lines 9 extend from the control signal input FPC 8, lie on the active matrix substrate 1 and the TAB substrate 2 by means of the ACF, and reach the driver IC 7.

As has been discussed, according to the liquid crystal display of the present embodiment, the control signal input FPC 8 is directly connected to the active matrix substrate 1. Also, a control signal outputted from the control signal input FPC 8 is inputted to the driver circuit IC 7 via the input lines 9 formed on the active matrix substrate 1. On the contrary, according to the arrangement discussed in the prior art column, the control signal input FPC 60 is connected to the PCB 52, from which the signal is inputted to the driver IC 57 formed on the FPC 58. In other words, according to the arrangement of the present embodiment, because an arrangement for providing the input lines 9 can be made smaller, not only can the frame edge portion of the liquid crystal display be reduced, but also the weight thereof can be reduced.

Also, the adjacent driver ICs 7 are connected to each other via the common connection lines 10 which also connect the corresponding electrode terminals formed on the TAB substrates. The common connection lines 10 connect the adjacent driver ICs formed on the TAB substrate 2 as they extend from one TAB substrate 2, lie on the active matrix substrate 1, and reach the other TAB substrate 2. To be more specific, in the adjacent driver ICs 7, the common connection lines 10 are provided to extend from the ACF of the TAB substrate 2 furnished with one of the drivers IC 7 to the ACF of the TAB substrate 2 furnished with the other driver IC7 by being laid on the active matrix substrate 1. In other words, the common connection lines 10 are used to connect the adjacent driver ICs 7, and are provided on the opposite side to the driver ICs 7 when seen from one edge of the TAB substrate 2 where the ACF is formed.

As shown in FIG. 2, electrode terminals connected to the terminals of the driver ICs 7 are formed on the TAB substrates 2 at the area where the ACF is formed. Also, the common connection lines 10 connect the corresponding electrode terminals of the adjacent TAB substrates 2 to each other.

As has been discussed, because the common connection lines 10 are provided on the active matrix substrate 1, an arrangement for providing the common connection lines 10 can be reduced further in comparison with the conventional arrangement that the common connection lines are provided on the PCB. Consequently, not only can the frame edge portion of the liquid crystal display be reduced further, but also the weight thereof can be reduced.

The input lines 9 and common connection lines 10 include power source lines for supplying power to the driver ICs 7. In other words, power is supplied to one particular driver IC 7 from an external power source via the input lines 9, and further to the other driver ICs 7 via the common connection lines 10. Consequently, the power source lines for supplying power to the driver ICs 7 individually can be formed simultaneously with the input lines 9 and common connection lines 10. Also, an arrangement for providing the power source lines does no have to be provided separately. Consequently, not only can the manufacturing costs and manufacturing time be saved, but also the size and weight of the device can be reduced while saving the material costs at the same time.

In the present embodiment, the power source lines are arranged to be included in the input lines 9 and common connection lines 10. However, the arrangement is not limited to the foregoing, and the power source lines may be directly connected to each driver IC.

Figure 5:
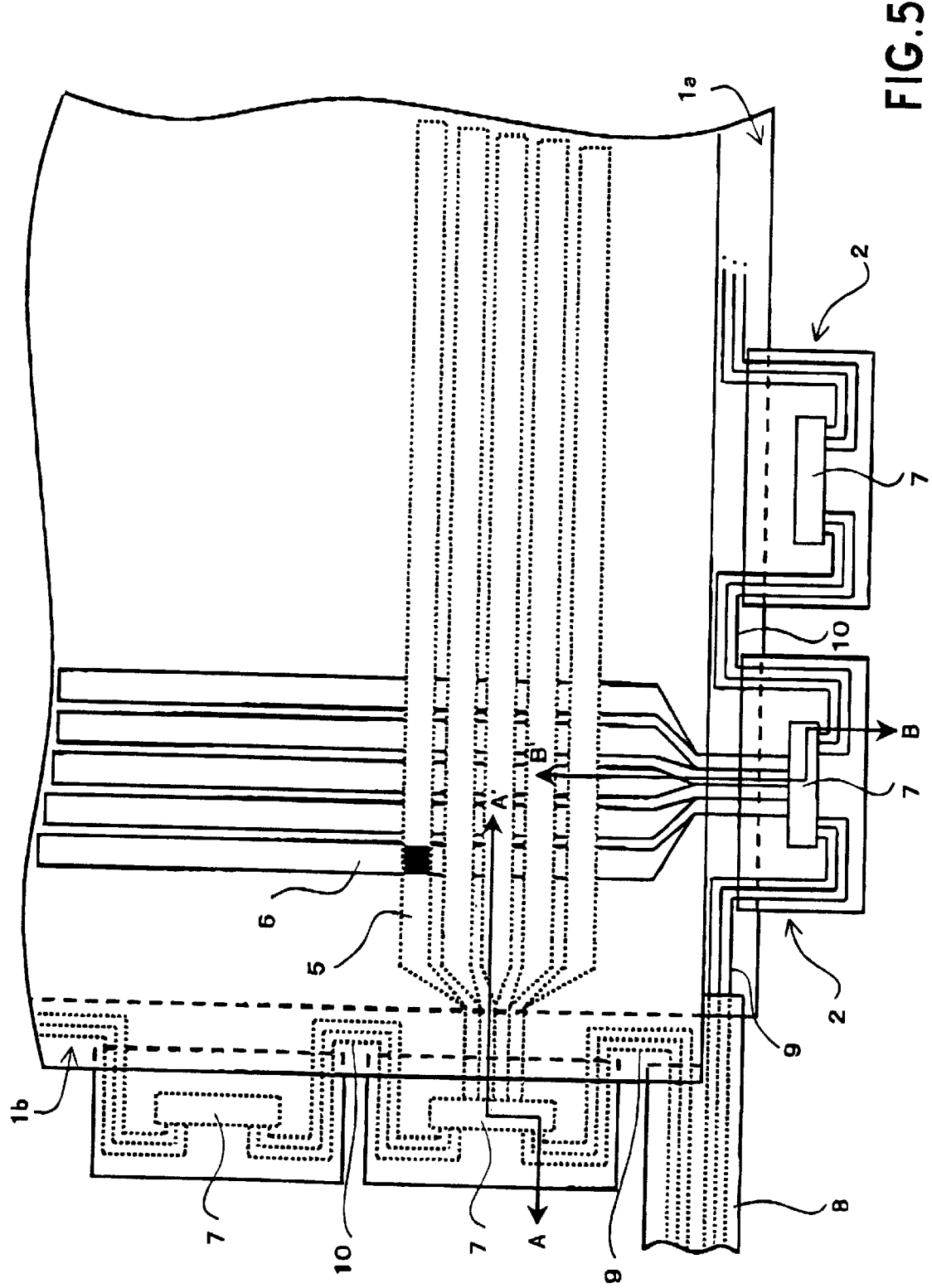
FIG. 5 is a partial plan view schematically showing an arrangement of a liquid crystal display in accordance with one embodiment of the present invention.
Figure 6:
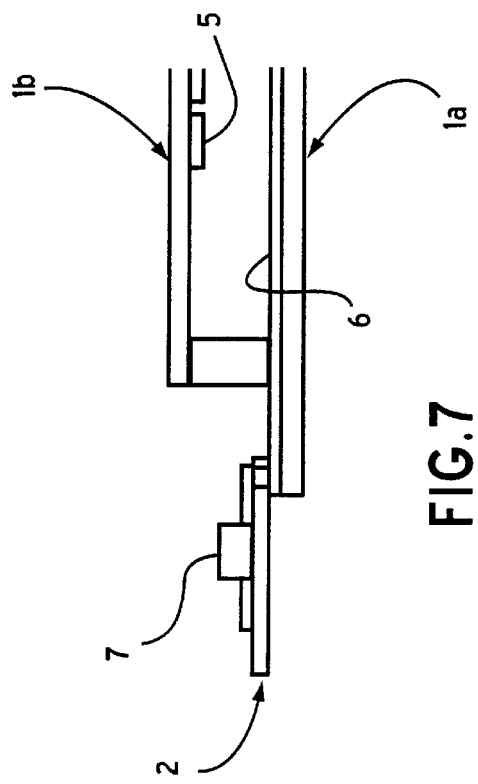
FIG. 6 is a cross-section view taken along line A–A' in FIG. 5.
Figure 7:
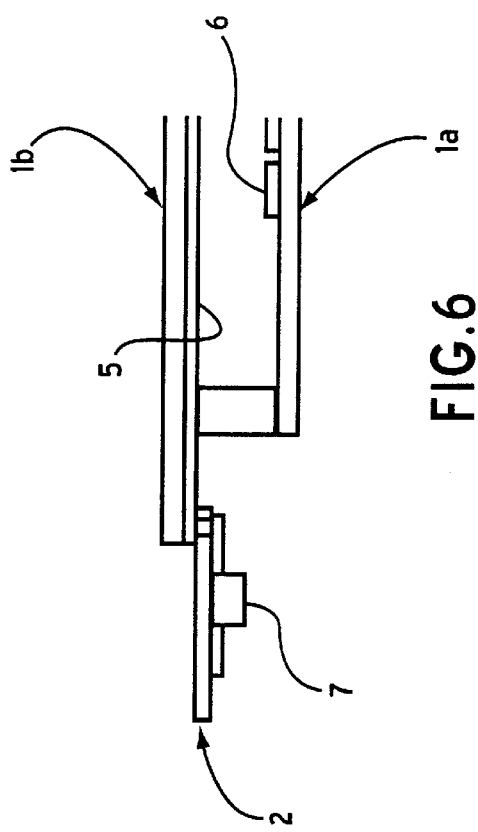
FIG. 7 is a cross-section view taken along line B–B' in FIG. 5.

FIG. 5 shows an example of the invention applied to an STN simple-matrix liquid crystal display. FIGS. 6 and 7 are cross-sections taken along lines A–A'0 and B–B', respectively, in FIG. 5. As explained previously, a group of the common connection lines 10 and/or the input lines 9 can be formed with the gate bus lines 5. A second group of the common connection lines 10 and/or the input lines 9 can be formed with the source bus lines 6. The example illustrated in FIG. 5 shows the source bus lines 6 formed on substrate 1a, while the gate bus lines 5 are formed on substrate 1b. It is known that the gate bus lines can be formed on one substrate, while the source bus lines can be formed on a second substrate. In this arrangement, some of the common connection lines 10 and input lines 9 are formed on substrate 1a. The remainder of the common connection lines 10 and input lines 9 are formed on substrate 1b.

The foregoing describeb the arrangement of the driver ICs 7 to send the data signal to the source bus lines 6, and it shoud be appreciated that the driver IC to send the scanning signal to the bus line 5 are arranged in the same manner.

The above-arranged liquid crystal display displays an image in the following manner. When power is supplied to the driver ICs 7 from the power source, the control signal inputted from the control signal input FPC 8 enters into one particular driver IC 7 via the input lines 9, and further into the other driver ICs 7 via the common connection lines 10. Then, the data signal and scanning signal are inputted to each source bus line 6 and gate bus line 5 from the corresponding driver IC 7. Accordingly, the data signal and scanning signal are provided to each TFT 4, and a voltage is applied to each pixel electrode 3 in accordance with these signals. Consequently, a desired image is displayed in response to change in light transmissivity as the orientation of the liquid crystal molecules varies.

Next, the following will explain the manufacturing method of the active matrix substrate 1. To begin with, the TFTs 4, gate bus lines 5, source bus lines 6, and pixel electrodes 3 are formed on the glass substrate in a known manner. Here, as previously mentioned, the gate bus lines 5 and source bus lines 6 are multi-layer metal lines having at least one layer of aluminum. When either the gate bus lines 5 or source bus lines 6 are etched, the etching is effected in such a manner that a part of the input lines 9 and common connection lines 10 formed on the active matrix substrate 1 will be made out of the layer of aluminum.

In other words, when arranged in the above manner, all of the input lines 9 and/or common connection lines 10 can be formed on the active matrix substrate 1 simultaneously with either the gate bus lines 5 or source bus lines 6. Alternatively, some of the input lines 9 and/or common connection lines 10 can be formed simultaneously with the gate bus lines 5, while the remainder of the input lines 9 and/or common connection lines 10 can be formed simultaneously with the source bus lines 6. Thus, the input lines 9 and common connection lines 10 can be formed without increasing the number of steps in the manufacturing procedure, thereby making it possible to save the manufacturing costs.

The reason why the input lines 9 and/or common connection lines 10 can be formed on the active matrix substrate 1 simultaneously with either the gate bus lines 5 or source bus lines 6 in the present embodiment is because the gate bus lines 5 or source bus lines 6 do not cross the input lines 9 and common connection lines 10 when seen from a direction perpendicular to the display surface. Assume that these lines cross each other, then an insulating layer must be formed between the gate bus lines 5 or source bus lines 6 and the input lines 9 and common connection lines 10. More specifically, after the gate bus lines 5 or source bus lines 6 are formed, the insulating layer is formed, and then the input lines 9 and common connection lines 10 are formed in separate steps.

Aluminum of which the gate bus lines 5 and source bus lines 6 are made is a material having relatively small resistance, and therefore, a suitable material for the bus lines. Thus, a satisfactory liquid crystal display which does not cause problems, such as a delayed signal and a voltage drop, can be provided. In addition, in case that the gate bus lines 5 or source bus lines 6 are formed simultaneously with the input lines 9 and/or common connection lines 10 as has been discussed above, the input lines 9 and common connection lines 10 are given with small resistance because they can be made of aluminum.

Next, the following will explain the arrangement of the common connection lines 10 more in detail. FIG. 2 is a plan view showing enlarged common connection lines 10 of the present embodiment. FIG. 3 is a plan view showing comparative enlarged common connection lines 10. In the following, the common connection lines 10 of the present embodiment are denoted as $10A_0 \cdot 10A_1 \ldots 10A_{n-1} \cdot 10A_n$ and the comparative common connection lines 10 are denoted as $10B_0 \cdot 10B_1 \ldots 10B_{n-1} \cdot 10B_n$.

In each of the arrangements of FIGS. 2 and 3, the common connection lines $10A_0 \cdot 10A_1 \ldots 10A_{n-1} \cdot 10A_n$ ($10B_0 \cdot 10B_1 \ldots 10B_{n-1} \cdot 10B_n$) are respectively provided with line resistance of R0 . . . Rn, inter-line capacitances of C0 . . . Cn, line lengths of L0 . . . Ln, line widths of W0 . . . Wn, and inter-line gap widths of G0 . . . Gn−1.

The line resistance referred to herein means a resistance value of each line. Also, the inter-line capacitances referred hereto mean capacitances generated between every adjacent lines, which vary in response to the inter-line gap widths. The line length referred to herein means a distance from one ACF portion to the adjacent ACF portion in each line. The line width referred to herein means a width of each line in a direction perpendicular to the line length. The inter-line gap width referred herein means a distance between adjacent lines.

In FIGS. 2 and 3, line resistance R0, inter-line capacitance C0, line length L0, line width W0, and inter-line gap width G0 are given as the values for the most inner common connection line $10A_0$ ($10B_0$), and subscript numerals for the common connection lines increase from the inner to the outer.

As shown in FIG. 2, the line widths and inter-line distance of the $10A_0 \cdot 10A_1 \ldots 10A_{n-1} \cdot 10A_n$ increase from the inner to the outer. That is, relations, W0<W1<. . . Wn−1<Wn and G0<G1<. . . Gn−1, are established.

On the other hand, as shown in FIG. 3, equal values are given to the line widths and inter-line gap width of the $10B_0 \cdot 10B_1 \ldots 10B_{n-1} \cdot 10B_n$ in the comparative example. That is, relations, W0=W1 . . . Wn−1=Wn and G0=G1= . . . Gn−1, are established.

In either arrangement, as shown in FIGS. 2 and 3, the line lengths increase from the inner to the outer. That is, a relation, L0<L1 . . . <Ln−1<Ln, is established.

Of all the signals to be delivered, the clock signal and data signal have to be synchronized in the common connection lines 10 which connect the adjacent driver ICs 7. In other words, each common connection line 10 has to be given with the same time constant, so that a quantity of delay of the delivered signal is substantially the same for each line. Thus, given τ as the time constant, then each common connection line 10 has to be designed to establish a relation, τ=R0×C0=R1×C1=. . . =Rn×Cn.

Here, in case of the comparative example, the relations, W0=W1 . . . Wn−1=Wn and G0=G1=. . . Gn−1, are established under the condition that satisfies the relation, L0<L1<. . . Ln−1<Ln. Thus, the relations, R0<R1<. . . <Rn−1<Rn and C0<C1<. . . <Cn−1<Cn, are established. In other words, in this case, the time constants given to the common connection lines increase from the inner to the outer.

On the other hand, in case of the present embodiment, the relations, W0<W1<. . . <Wn−1<Wn and G0<G1<. . . <Gn−1, are established under the condition that satisfies the relation, L0<L1<. . . <Ln−1<Ln. Thus, the relations, R0=R1=. . . Rn−1=Rn and C0=C1=. . . Cn−1=Cn, can be established.

In order to establish the relations, R0=R1=. . . Rn−1=Rn and C0=C1=. . . Cn−1=Cn, the relations W0<W1<. . . <Wn<Wn−1<Wn and G0<G1<. . . <Gn−1 may be established. However, because the treatment accuracy is limited in practice, for example, the line may not be formed with the smallest values of W0 and G0. In such a case, the line widths W0 . . . Wn and inter-line gap widths G0 . . . Gn−1 may be set in a treatable range by multiplying the time constant with a constant, that is, τg0=τg1=. . . τgn.

Also, the resistance of each line can be adjusted minutely by varying the line widths, and changing the structure of a metal film forming the lines from a single-layer to multi-layer or a combination thereof, or changing the metal materials forming the lines.

As has been discussed, according to the arrangement of the present embodiment, all the common connection lines $10A_0 \cdot 10A_1 \ldots 10A_{n-1} \cdot 10A_n$ are given with the same time constant. Thus, the signals, such as the clock signal and data signal, can be synchronized in each line, thereby making it possible to prevent data grabbing mistakes caused by the phase shift between the clock signals and data signals. Consequently, a reliable and high-quality liquid crystal display device can be provided.

As has been discussed, the liquid crystal display of the present embodiment includes an active matrix substrate furnished with a plurality of switching elements and a matrix of pixel electrodes connected to the switching elements in one-to-one correspondence, a plurality of gate bus lines connected to the gate electrodes of the switching elements, a plurality of source bus lines connected to the source electrodes of the switching elements, a plurality of driver circuits for inputting signals to the gate bus lines and/or source bus lines, and a plurality of mounting substrates on which the driver circuits are formed, wherein the mounting substrates are connected to the active matrix substrate by means of an anisotropic conductive film, and common connection lines are formed on the active matrix substrate to interconnected the driver circuits.

According to the above arrangement, because the mounting substrates are directly connected to the active matrix substrate by means of the anisotropic conductive film, for example, a total area of the driver circuits can be saved in comparison with the arrangement discussed in the prior art that the active matrix substrate and PCB provided with lines are connected by means of the FPCs furnished with the driver ICs. Thus, not only can the area of the frame edge portion in the liquid crystal display be reduced, but also the weight thereof can be reduced. Further, because fewer materials are used, the material costs can be saved, while the number of the steps in the manufacturing procedure can be reduced. Consequently, the manufacturing costs can be saved.

Because the common connection lines which connect the adjacent driver circuits are provided on the active matrix substrate, for example, the size of the mounting substrates can be reduced in comparison with a case where the common connection lines are provided on the mounting substrates. Thus, not only can the frame edge portion of the liquid crystal be reduced further, but also the weight thereof can be reduced further.

Also, the liquid crystal display may be arranged in such a manner so as to be furnished further with a signal input circuit for inputting a signal to the driver circuits, and input lines for connecting the signal input circuit to the driver circuits, and that the signal input circuit is connected to the active matrix substrate and the input lines are provided on the active matrix substrate.

According to the above arrangement, the signal input circuit is directly connected to the active matrix substrate, and the signal is inputted to the driver circuits via the input lines provided on the active matrix substrate. In contrast, in case of the arrangement discussed in the prior art column, the control signal input FPC is connected to the PCB. In other words, the arrangement of the present invention can reduce the size of the mounting substrates further, and therefore, the frame edge portion of the liquid crystal display can be reduced further while reducing the weight thereof at the same time.

In addition, the liquid crystal display may be arranged in such a manner that the common connection lines connecting two particular driver circuits are given with same line resistance and same inter-line capacitances.

According to the above arrangement, because the common connection lines connecting two particular driver circuits are given with same line resistance and same inter-line capacitances, the common connection lines can be provided with the same time constant. Thus, the signals, such as clock signal and data signal, can be synchronized in each common connection line and the data grabbing mistakes caused by the phase shift between the clock signal and data signal can be prevented. Hence, a reliable and high-quality liquid crystal display can be provided.

In addition, the liquid crystal display may be arranged in such a manner that line widths and distances between adjacent lines of the common connection lines connecting the two particular driver circuits decrease from the longest to the shortest.

According to the above arrangement, by merely setting the shape and size of the common connection lines, the same values can be given respectively to the line resistance and inter-line capacitances.

The liquid crystal display may be arranged in such a manner that the common connection lines are formed simultaneously with the either gate bus lines or source bus lines.

According to the above arrangement, because the common connection lines are formed simultaneously with either the gate bus lines or source bus lines, the common connection lines can be provided without increasing the number of steps, thereby making it possible to reduce the manufacturing costs.

The liquid crystal display device may be arranged in such a manner that the input lines are formed simultaneously with either the gate bus lines or source bus lines.

According to the above arrangement, because the input lines are formed it simultaneously with either the gate bus lines or source bus lines, the input lines can be provided without increasing the number of steps, thereby making it possible to reduce the manufacturing costs.

The liquid crystal may be arranged in such a manner that the gate bus lines and/or source bus lines have a layer of aluminum.

According to the above arrangement, aluminum, of which the gate bus lines and/or source bus lines are made, has relatively small resistance, and therefore, is a suitable material as the bus lines. Thus, a satisfactory liquid crystal display which does not cause problems, such as a delayed signal and a voltage drop, can be provided.

For example, in case that the input lines or common connection lines are formed simultaneously with either the gate bus lines or source bus lines as discussed above, the common connection lines or input lines can be made of aluminum, thereby realizing lines having small resistance.

The liquid crystal display may be arranged in such a manner that the common connection lines include power source lines for supplying power to the driver circuits.

According to the above arrangement, because the common connection lines include the power source lines for supplying power to the driver circuits, the power source lines can be formed simultaneously with the common connection lines. Also, an arrangement for providing the power source lines does not have to be provided separately. Consequently, not only can the manufacturing costs and manufacturing time be saved, but also the size and weight of the device can be reduced while saving the material costs at the same time.

The liquid crystal display may be arranged in such a manner that the input lines include power source lines for supplying power to the driver circuits.

According to the above arrangement, because the input lines include the power source lines for supplying power to the driver circuits, the power source lines can be formed simultaneously with the input lines. Also, an arrangement for providing the power source lines does not have to be provided separately. Consequently, not only can the manufacturing costs and manufacturing time be saved, but also the size and weight of the device can be reduced while saving the material costs at the same time.

The present embodiment described, as an example of the liquid crystal display, a liquid crystal display of the active matrix type furnished with a plurality of switching elements and a matrix of pixel electrodes connected to the switching elements in one-to-one correspondence. However, applications of the technical idea of the present invention are not limited to the foregoing. For example, the same effect can be achieved by a liquid crystal display of the direct matrix type of the STN method by using the driver circuits arranged in the same manner as those of the present embodiment.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display comprising:
   a first substrate and a second substrate;
   a liquid crystal layer sandwiched between said first substrate and second substrate;
   data signal lines provided on one of said first substrate and said second substrate;
   scanning signal lines provided on one of said first substrate and said second substrate;
   a plurality of driver circuits for inputting a signal into said data signal lines and/or scanning signal lines; and a plurality of mounting substrates, each provided with one of said driver circuits and a plurality of electrode terminals connected to one of said driver circuits, wherein said plurality of mounting substrates is connected to said first substrate and/or said second substrate; and a plurality of common connection lines for interconnecting respective corresponding electrode terminals of adjacent mounting substrates, wherein said plurality of common connection lines are provided on said first substrate and/or said second substrate, wherein said plurality of electrode terminals are provided proximate to an edge of each mounting substrate, the edge is located in a direction toward said first substrate and/or said second substrate when viewed from the one of said driver circuits, and said plurality of common connection lines are provided opposite to one of said driver circuits when viewed from the edge of said mounting substrate.

2. The liquid crystal display of claim 1, wherein said plurality of mounting substrates is connected to said first substrate and/or said second substrate through an anisotropic conductive film.

3. The liquid crystal display of claim 1 further comprising:

a signal input circuit, connected to said first substrate and/or said second substrate, for inputting a signal to said plurality of driver circuits; and input lines, provided on said first substrate and/or said second substrate, for connecting said signal input circuit to said plurality of driver circuits.

4. The liquid crystal display of claim 3, wherein said input lines are formed simultaneously with either said data signal lines or said scanning signal lines.

5. The liquid crystal display of claim 3, wherein said input lines include power source lines for supplying power to said plurality of driver circuits.

6. The liquid crystal display of claim 3, wherein a first group of said input lines are formed simultaneously with said data signal lines and a second group of said input lines are formed simultaneously with said scanning signal lines.

7. The liquid crystal display of claim 3, wherein all of said input lines are formed simultaneously with either said data signal lines or said scanning signal lines.

8. The liquid crystal display of claim 1, wherein said common connection lines connecting two adjacent driver circuits are given with same line resistance and same interline capacitances.

9. The liquid crystal display of claim 8, wherein said plurality of common connection lines connecting said two adjacent driver circuits have different line lengths.

10. The liquid crystal display of claim 9, wherein line widths and distances between adjacent lines of said common connection lines connecting said adjacent driver circuits decrease from longest to shortest.

11. The liquid crystal display of claim 1, wherein said plurality of common connection lines are formed simultaneously with either said data signal lines or said scanning signal lines.

12. The liquid crystal display of claim 1, wherein said data signal lines and/or scanning signal lines have a layer of aluminum.

13. The liquid crystal display of claim 1, wherein said common connection lines include power source lines for supplying power to said plurality of driver circuits.

14. The liquid crystal display of claim 1, wherein:

said first substrate is an active matrix substrate furnished with a plurality of switching elements and a matrix of pixel electrodes connected to said switching elements in one-to-one correspondence;

said data signal lines are connected to source electrodes of said switching elements; and said scanning signal lines are connected to gate electrodes of said switching elements.

15. The liquid crystal display of claim 1, wherein a first group of said common connection lines are formed simultaneously with said data signal lines and a second group of said common connection lines are formed simultaneously with said scanning signal lines.

16. The liquid crystal display of claim 1, wherein all of said common connection lines are formed simultaneously with either said data signal lines or said scanning signal lines.

* * * * *